United States Patent
Hosotani

(10) Patent No.: US 10,224,750 B2
(45) Date of Patent: Mar. 5, 2019

(54) WIRELESS POWER TRANSMISSION APPARATUS

(71) Applicant: MURATA MANUFACTURING CO., LTD., Kyoto-fu (JP)

(72) Inventor: Tatsuya Hosotani, Kyoto-fu (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 448 days.

(21) Appl. No.: 14/855,771

(22) Filed: Sep. 16, 2015

(65) Prior Publication Data

US 2016/0006270 A1 Jan. 7, 2016

Related U.S. Application Data

(63) Continuation of application No. PCT/JP2014/057974, filed on Mar. 24, 2014.

(30) Foreign Application Priority Data

Mar. 27, 2013 (JP) .................................. 2013-067064

(51) Int. Cl.
*H01F 27/42* (2006.01)
*H01F 37/00* (2006.01)
(Continued)

(52) U.S. Cl.
CPC ................ *H02J 50/12* (2016.02); *H01F 5/00* (2013.01); *H01F 27/346* (2013.01); *H01F 38/14* (2013.01);
(Continued)

(58) Field of Classification Search
CPC .. H02J 50/12; H02J 5/005; H02J 7/025; H02J 50/10; H02J 50/80; H04B 5/0037; H01F 38/14
See application file for complete search history.

(56) References Cited

U.S. PATENT DOCUMENTS

| | | | |
|---|---|---|---|
| 6,476,766 | B1 | 11/2002 | Cohen |
| 2003/0151556 | A1* | 8/2003 | Cohen ..................... H01Q 1/243 |
| | | | 343/700 MS |

(Continued)

FOREIGN PATENT DOCUMENTS

| | | |
|---|---|---|
| JP | 2008-206327 A | 9/2008 |
| JP | 2008-271496 A | 11/2008 |

(Continued)

OTHER PUBLICATIONS

Tatsuya Hosotani; "A Novel Design Theory Using Coupling Coefficient for the ZVS Resonant Wireless Power Transfer with High-Frequency Power Electronics"; IEICE Technical Report WPT2012-23; Nov. 2012; pp. 17-22; The Institute of Electronics, Informatoin and Communication Engineers; Japan. URL http://www.wpm-c.com/wp-content/uploads/2013/10/WPT2012-23.pdf.

(Continued)

*Primary Examiner* — Hal Kaplan
*Assistant Examiner* — Rasem Mourad
(74) *Attorney, Agent, or Firm* — Studebaker & Brackett PC

(57) ABSTRACT

A power transmitter and a power receiver are arranged with a space therebetween. A power transmitting device generates a resonant current by taking out electric energy from a DC power supply through an operation of a power transmitting switch circuit, directly creating, in a space, by using the resonant current, an electromagnetic field that periodically changes at a switching frequency, and forms an electromagnetic resonance field in which the space itself has energy and vibrates. A power receiving device generates a resonant current by obtaining electric energy from the resonance field and forms a new electromagnetic field on the basis of this resonant current. The power transmitting device or the power receiving device, when viewed as a geometric figure, (Continued)

is a fractal-shaped device formed of a line conductor pattern in which a portion is similar to the whole, and increases electromagnetic field energy in a space surrounding the fractal-shaped device.

22 Claims, 15 Drawing Sheets

(51) Int. Cl.
    *H01F 38/00*      (2006.01)
    *H02J 50/12*      (2016.01)
    *H02J 50/70*      (2016.01)
    *H01F 38/14*      (2006.01)
    *H01F 5/00*      (2006.01)
    *H01F 27/34*      (2006.01)
    *H02J 50/10*      (2016.01)
    *H02J 50/80*      (2016.01)

(52) U.S. Cl.
    CPC .............. *H02J 50/10* (2016.02); *H02J 50/70* (2016.02); *H02J 50/80* (2016.02)

(56) References Cited

U.S. PATENT DOCUMENTS

| | | | |
|---|---|---|---|
| 2008/0088903 A1* | 4/2008 | Matteo | H01Q 1/36 359/227 |
| 2008/0252530 A1 | 10/2008 | Bae et al. | |
| 2011/0133569 A1* | 6/2011 | Cheon | H02J 17/00 307/104 |
| 2012/0262004 A1 | 10/2012 | Cook et al. | |
| 2012/0306281 A1 | 12/2012 | Bohori et al. | |
| 2012/0306701 A1 | 12/2012 | Popugaev et al. | |
| 2013/0033118 A1* | 2/2013 | Karalis | H01F 38/14 307/104 |
| 2014/0011447 A1* | 1/2014 | Konanur | H04B 5/00 455/41.1 |

FOREIGN PATENT DOCUMENTS

| | | |
|---|---|---|
| JP | 2011-160499 A | 8/2011 |
| JP | 2012-503959 A | 2/2012 |
| JP | 2012-222826 A | 11/2012 |
| JP | 2012-254006 A | 12/2012 |

OTHER PUBLICATIONS

Junki Ohasa et al.; "Study on Wireless Power Transmission via Fractal Antenna"; IEICE Technical Report WPT2012-16; Aug. 2012; pp. 7-12; The Institute of Electronics, Informatoin and Communication Engineers; Japan. URL http://www.ieice.org/~wpt/paper/WPT2012-16.pdf.

International Search Report from PCT/JP2014/057974 dated May 20, 2014.

Written Opinion of International Searching Authority from PCT/JP2014/057974 dated May 20, 2014.

\* cited by examiner

FIG. 1
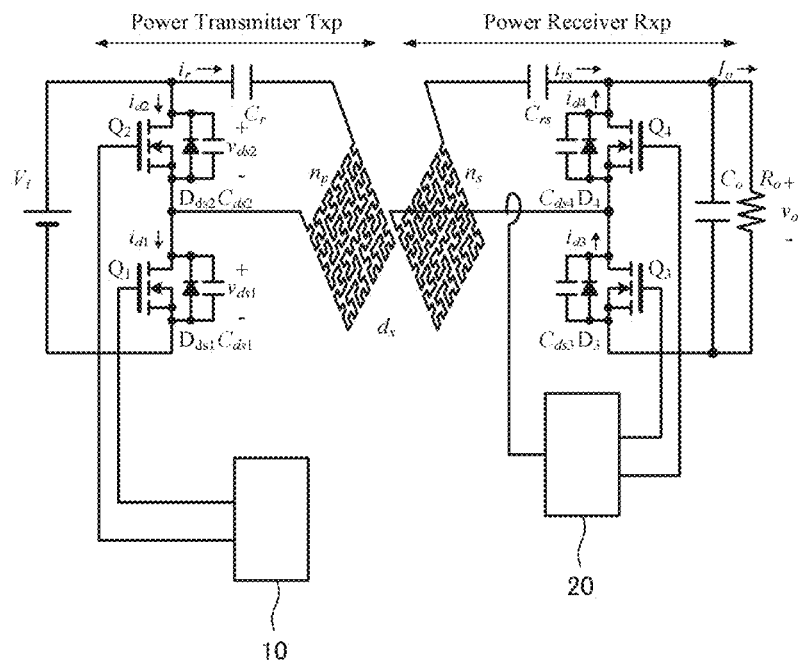
FIG. 2
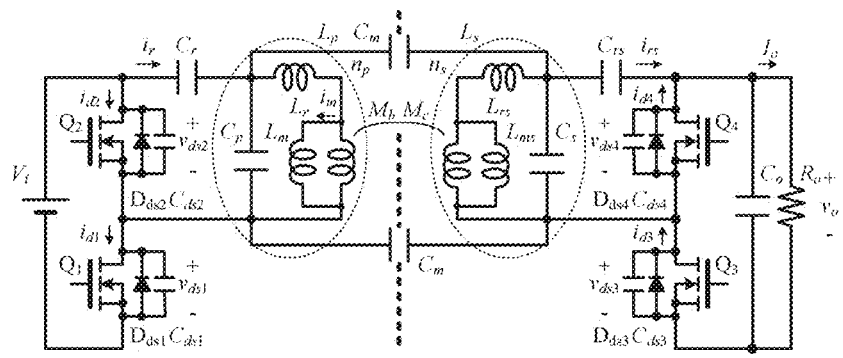
| FIG. 3(a) | FIG. 3(b) | FIG. 3(c) | FIG. 3(d) | FIG. 3(e) |
|---|---|---|---|---|
| n=1 | n=2 | n=3 | n=4 | n=5 |
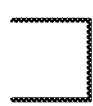 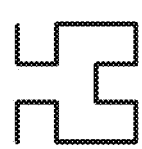 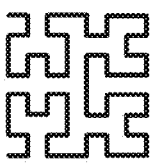 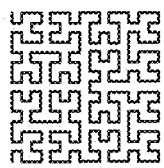 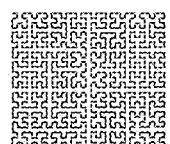

FIG. 8(a) n=1   FIG. 8(b) n=2
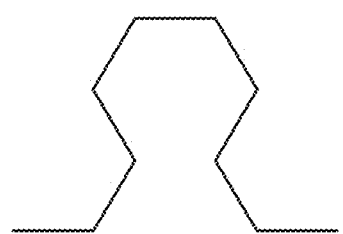
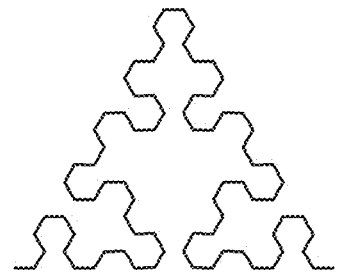
FIG. 8(c) n=3   FIG. 8(d) n=4
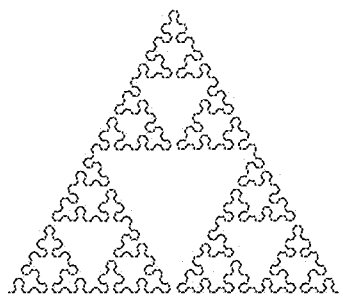
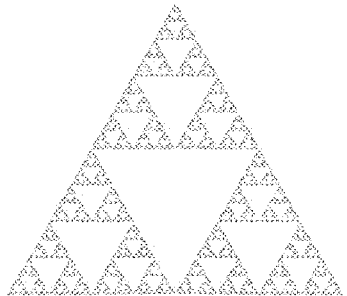
FIG. 9(a) n=0
FIG. 9(b) n=1
FIG. 9(c) n=2
FIG. 9(d) n=3
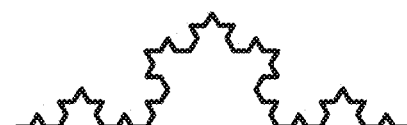
FIG. 9(e) n=4
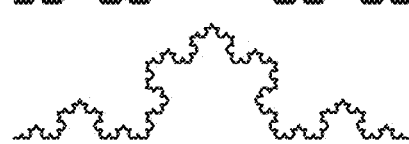

FIG. 10(a) n=1
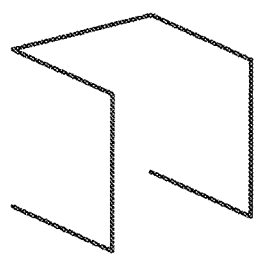
FIG. 10(b) n=2
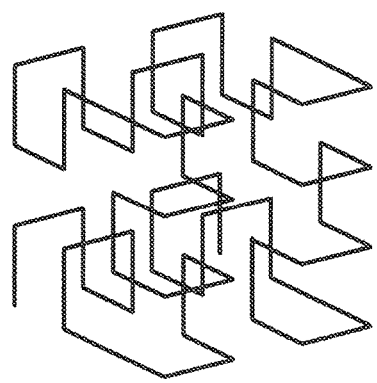
FIG. 10(c) n=3
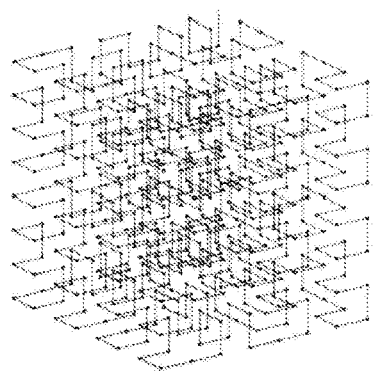
FIG. 10(d) n=3
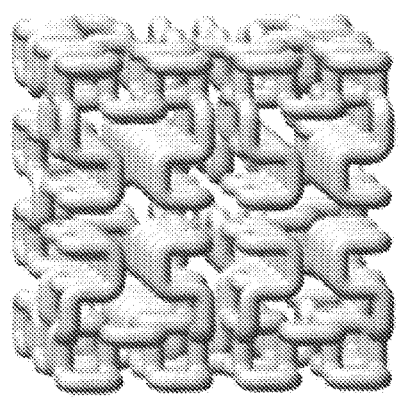

WIRELESS POWER TRANSMISSION APPARATUS

CROSS-REFERENCE TO RELATED APPLICATION

This application claims benefit of priority to Japanese Patent Application No. 2013-067064 filed Mar. 27, 2013, and International Patent Application No. PCT/JP2014/057974 filed Mar. 24, 2014, the entire content of each of which is incorporated herein by reference.

TECHNICAL FIELD

The present disclosure relates to a wireless power transmission apparatus including a power transmitter and a power receiver.

BACKGROUND

In recent years, in accordance with a reduction in the size of an electronic apparatus and a reduction in the power consumption of the electronic apparatus and, further, an increase in the capacity of a battery, the number of battery-driven electronic apparatuses has increased. In addition, wireless communication has been increasingly used for short-distance data communication among apparatuses. In view of these situations, short-distance power transmission techniques have been recently the focus of considerable attention.

For example, as illustrated in Japanese Unexamined Patent Application Publication No. 2008-206327, an existing non-contact charging system is formed of a power transmitter including a primary coil at, e.g., a charging stand and a portable electronic apparatus including a secondary coil and a rechargeable battery, and a user mounts the portable electronic apparatus on the power transmitter. As a result of this, power is supplied to a charging device side through electromagnetic induction coupling (magnetic-field coupling) between the primary coil of the power transmitter and the secondary coil of the portable electronic apparatus, and a secondary battery is charged.

Citation List

SUMMARY

Technical Problem

In the non-contact charging system disclosed in Japanese Unexamined Patent Application Publication No. 2008-206327, the power transmitting coil and the power receiving coil, which function as an insulated transformer that utilizes electromagnetic induction, are only used as a transformer utilizing magnetic field coupling. In a transformer utilizing electromagnetic induction, it is important to allow a current to flow by making magnetic flux generated by a current flowing through the primary winding link with the secondary winding, and realize efficient conversion from electricity to magnetism, and then back to electricity.

In a wireless power transmission apparatus that utilizes electromagnetic induction, it is important to know how to increase the degree of magnetic coupling between the primary winding and the secondary winding in order to increase power conversion efficiency. However, in order to prevent magnetic saturation, or due to physical constraints, it is often difficult to increase the degree of magnetic coupling of a transformer and, hence, resulting in insufficient power conversion efficiency.

In recent years, research and development on a wireless power transmission technique that uses a resonance method has become active. According to an experiment regarding power transmission at 10 MHz over a distance of 2 m, which was reported by Massachusetts Institute of Technology (MIT) in 2007 and which has attracted attention, the power transmission efficiency was as low as about 15%. It is thought that the main reason for this is that a high-frequency AC current was generated by using the Colpitts oscillator. It is thought that a lot of power is lost in the stage of generating an AC current in a power amplifier circuit in the Colpitts oscillator. It is not too much to say that the most important thing in wireless power transmission is high-efficiency generation of a high-frequency AC current.

The present disclosure relates to a device that performs wireless power transmission by forming electromagnetic field resonant coupling. Performing wireless power transmission based on electromagnetic field resonant coupling has the following problems.

(a) In an existing magnetic field resonance technology, a high-frequency AC power supply is used as a power supply for generating magnetic flux, and a linear amplifier based on a class A amplifier has been used. However, a power amplifier has large power loss. For example, in a class A amplifier, the maximum theoretical power efficiency for generating AC power is just 50%. In other words, the use of a power amplifier circuit results in a wireless power transmission system having very low power efficiency.

(b) On the other hand, in an electromagnetic field resonance technology, a helical coil, a device, a spiral coil, a meandering antenna, and the like can be used for power transmitting/receiving devices. However, in an existing power transmission/reception apparatus, an unfavorable influence is given to peripheral apparatuses due to electromagnetic noise radiated from the power transmitting and receiving devices, and hence, there has been a problem in electromagnetic compatibility (EMC).

It is an object of the present disclosure to provide a wireless power transmission apparatus that has high power transmission efficiency and ensures sufficient electromagnetic compatibility (EMC).

Solution to Problem

A wireless power transmission apparatus according to the present disclosure is configured as follows.

(1) A wireless power transmission apparatus includes:
   a power transmitter including a DC power supply supplying electric energy and a power transmitting device electrically connected to the DC power supply,
   power receiver including a load that consumes electric power and a power receiving device electrically connected to the load,
   a power transmitting resonant circuit formed of an inductive impedance included in the power transmitting device and a capacitive impedance of a resonant capacitor realized by a parasitic capacitance of the power transmitting device or an external capacitor,
   a power transmitting switching circuit, electrically connected to the power transmitting resonant circuit, including a switch device intermittently providing the power transmitting resonant circuit with the DC power supply through on and off operations and a switch control circuit causing the power transmitting resonant circuit to generate a resonant current through control of the switch device, a power receiving resonant circuit formed of an inductive impedance included in the power receiving device and a capacitive impedance of a resonant capacitor realized by a parasitic capacitance of the power receiving device or an external capacitor, and a power receiving load circuit that is connected to the power receiving resonant circuit and that supplies energy based on a resonant current to the load.

The power transmitter and the power receiver are arranged with a space therebetween.

The power transmitting device generates a resonant current by taking out electric energy from the DC power supply through an operation of the power transmitting switch circuit, and directly creates, in a space, by using the resonant current, an electromagnetic field that periodically changes at a switching frequency fs, and forms an electromagnetic resonance field in which the space itself has energy and vibrates.

The power receiving device generates a resonant current by obtaining electric energy from the resonance field and forms a new electromagnetic field resonance field on a basis of this resonant current.

The power transmitting device or the power receiving device, when viewed as a geometric figure, is a fractal-shaped device formed of a line conductor pattern in which a portion is similar to a whole, and increases electromagnetic field energy in a space surrounding the fractal-shaped device.

The configuration described above provides the following advantageous effects.

It is possible to suppress unnecessary extension of an electromagnetic field resonance field and to store electromagnetic field energy by using a fractal-shaped device.

It is possible to use a parasitic inductive impedance or a capacitive impedance of a fractal-shaped device as electric circuit parameters for forming an electromagnetic field resonance field.

It is possible to reduce energy loss and increase the efficiency of a wireless power transmission apparatus by using a fractal-shaped device as a device for direct conversion between electric energy and electromagnetic field energy.

It is possible to suppress unnecessary extension of an electromagnetic field resonance field while realizing the objective of wireless power transmission.

It is possible to suppress radiation electromagnetic noise, enhance electromagnetic compatibility, and suppress unfavorable effects on human bodies or peripheral apparatuses, by using a fractal-shaped device.

(2) Preferably, the resonance field is formed in a region within one fifth of a product of a switching period Is (seconds), which is an inverse of the switching frequency fs, and a speed of light (about 300 thousand (km/sec)) from the power transmitting device or the power receiving device. With this configuration, a resonance field is formed within a range of 1/5 wavelengths from coils, and within this range, appropriate wireless power transmission can be performed.

(3) Preferably, the wireless power transmission apparatus further includes:

a field resonator that includes at least one resonant device and that is arranged in a space of a near field in which the power transmitting device and the power receiving device exist, and a resonant circuit formed of an inductive impedance and a capacitive impedance included in the resonant device or an external impedance, where the resonant device generates a resonant current by obtaining electric energy from the resonance field and forms a new electromagnetic field resonance field from this resonant current, and where the resonant device, when viewed as a geometric figure, is a fractal-shaped device formed of a line conductor pattern in which a portion is similar to a whole, and electromagnetic field energy in a space surrounding the fractal-shaped device is increased.

With the configuration described above, the following advantageous effects are obtained.

It is possible to suppress unnecessary extension of an electromagnetic field resonance field and to store electromagnetic field energy by using a fractal-shaped device.

It is possible to use a parasitic inductive impedance or a capacitive impedance of a fractal-shaped device as electric circuit parameters for forming an electromagnetic field resonance field.

It is possible to suppress unnecessary extension of an electromagnetic field resonance field while realizing the objective of wireless power transmission.

It is possible to suppress radiation electromagnetic noise, enhance electromagnetic compatibility, and suppress unfavorable effects on human bodies or peripheral apparatuses, by using a fractal-shaped device.

(4) Preferably, the line conductor pattern of the power transmitting device or the power receiving device has a configuration in which a number of steps (generations) n is larger than or equal to two and an external shape is approximately a square, a triangle, or approximately a cube, or is a polygonal line.

(5) Preferably, the line conductor pattern of the resonant device has a configuration in which a number of steps (generations) n is larger than or equal to two and an external shape is approximately a square, a triangle, or approximately a cube, or is a polygonal line.

With the configurations of (4) and (5), the following advantageous effects are obtained.

By employing a square, the space-filling factor of a space-filling curve is further increased.

By employing a triangle, restrictions in the arrangement of devices can be dealt with.

By employing a polygonal line, the line conductor can be formed in a range extending in the longitudinal direction.

By employing a cube, a device supporting three-dimensional directions can be formed.

By employing a polygon, external radiation of electromagnetic noise can be suppressed.

(6) Preferably, the line conductor pattern of the power transmitting device and the line conductor pattern of the power receiving device are fractal-shaped devices whose respective numbers of steps (generations) n are different from each other, if necessary.

With this configuration, restrictions in the arrangement of devices can be dealt with.

(7) Preferably, the line conductor pattern of the resonant device and the line conductor pattern of the power transmitting device or the power receiving device are fractal-shaped devices whose respective numbers of steps (generations) n are different from each other, if necessary.

With configuration described above, restrictions in the arrangement of devices can be dealt with.

(8) Preferably, the power receiving load circuit includes a rectifier circuit and supplies DC electric energy to the load.

With the configuration described above, DC electric energy can be supplied to a load and, hence, power can be supplied to a plurality of loads by connecting loads in parallel with each other, as a result of a DC voltage being supplied.

(9) Preferably, the switching control circuit makes a switching frequency fs satisfy a relationship fs=fr±30% for a resonant frequency fr at which an imaginary part X of an equivalent input impedance when a whole load side is viewed from input of the power transmitting resonant circuit becomes zero, the input being connected to the power transmitting switching circuit. With this configuration, switching is performed at a resonant frequency at which the imaginary part X of an equivalent input impedance when the whole load side is viewed from the input of the power transmitting resonant circuit becomes about zero, and a resonance field with high energy can be formed.

(10) Preferably, respective independent resonant frequencies of the power transmitting resonant circuit and the power receiving resonant circuit are the same within an error range of ±30%. With this configuration, it becomes easy to set the switching frequency for forming a resonance field.

(11) Preferably, respective independent resonant frequencies of the power transmitting resonant circuit and the resonant circuit are the same within an error range of ±30%. With this configuration, it becomes easy to set the switching frequency for forming a resonance field.

(12) Preferably, the switch device is an FET and the power transmitting switching circuit includes a parasitic capacitance of the FET and a free-wheeling diode. With this configuration, the switching circuit can be formed by utilizing the parasitic capacitance of the FET and the free-wheeling diode and, hence, through a reduction in the number of components, an increase in efficiency and a reduction in size can be realized in the wireless power transmission apparatus.

(13) Preferably, the switching control circuit makes a switching frequency fs satisfy a relationship fs fr for a resonant frequency fr at which an imaginary part X of an equivalent input impedance when a whole load side is viewed from input of the power transmitting resonant circuit becomes zero, the input being connected to the power transmitting switching circuit, and the switching frequency fs is set such that the imaginary part X satisfies a relationship X≥0. With this configuration, a zero-voltage switching (ZVS) operation of a switching device can be performed for a change in load. As a result, switching loss is reduced, the efficiency is increased, and a reduction in the size of the wireless power transmission apparatus can be realized.

(14) Preferably, the switching control circuit is configured such that a zero-voltage switching operation is performed by controlling the switch device so as to turn on the switch device when a voltage between two ends of the switch device is decreased to about zero volts. With this configuration, as a result of the switch device being turned on when a voltage between two ends of the switch device is decreased to about zero volts, switching loss can be reduced, whereby the efficiency can be increased and a reduction in the size of the wireless power transmission apparatus is realized.

(15) Preferably, the field resonator is one of a plurality of field resonators arranged in a space in the near field. With this configuration, as a result of the plurality of field resonators being arranged in a space in the near field where the power transmitter and the power receiver exist, the resonance field can be effectively extended and, hence, the degree of freedom in positioning of the power transmitter and the power receiver can be increased.

(16) Preferably, respective independent resonant frequencies of the plurality of resonant circuits are the same within an error range of ±30%. With this configuration, the extension of a resonance field becomes easy.

(17) Preferably, the power transmitter is provided in a plurality, and respective switching frequencies of the plurality of power transmitters are the same within an error range of ±30%. With this configuration, the resonance field can be extended as a result of the plurality of power transmitters being provided, and the electromagnetic field energy of a resonance field can be increased as a result of the switching frequencies of the respective power transmitters being approximately the same.

(18) Preferably, the power receiver is provided in a plurality, and resonant frequencies of the respective power receiving resonant circuits included in the plurality of power receivers are the same within an error range of ±30%. With this configuration, the resonance field can be extended as a result of the plurality of power receivers being provided, and a larger amount of electric energy can be obtained by the plurality of power receivers.

(19) Preferably, the power receiving device is provided in a plurality, and electric energy received by the plurality of power receiving devices is supplied to a load. With this configuration, the amount of electric energy that can be supplied to a load can be easily increased.

(20) Preferably, the power receiver is provided in a plurality, and respective switching frequencies of the plurality of power receivers are in an Industry-Science-Medical (ISM) band. With this configuration, interference with peripheral apparatuses due to electromagnetic noise is suppressed, and electromagnetic compatibility (EMC) can be achieved.

(21) Preferably, the power transmitter includes a filter that removes a frequency component other than the switching frequencies. With this configuration, interference with peripheral apparatuses due to electromagnetic noise is suppressed, and electromagnetic compatibility can be achieved.

(22) Preferably, the power transmitter and the power receiver each include a communication circuit for communication via radio waves. With this configuration, the power transmitter and the power receiver play the roles of both power transmission and signal transmission, and a reduction in the size and weight of the apparatuses can be realized. Further, an appropriate amount of power can be transmitted at an appropriate time from the power transmitter to an appropriate object power receiver.

(23) Preferably, the field resonator includes a communication circuit for communicating with the power transmitter or the power receiver via a radio wave. With this configuration, the field resonator plays the roles of both power transmission and signal transmission, and a reduction in the size and weight of the apparatuses can be realized. Further, communication can be performed at an appropriate time from the power receiver to an appropriate object power transmitter, and an appropriate amount of power can be easily received.

Advantageous Effects of Disclosure

According to the present disclosure, the following advantageous effects are obtained.

It is possible to suppress unnecessary extension of an electromagnetic field resonance field and to store electromagnetic field energy by using a fractal-shaped device.

It is possible to use a parasitic inductive impedance or a capacitive impedance of a fractal-shaped device as electric circuit parameters for forming an electromagnetic field resonance field.

It is possible to reduce energy loss and increase the efficiency of a wireless power transmission apparatus by using a fractal-shaped device as a device for direct conversion between electric energy and electromagnetic field energy.

It is possible to suppress unnecessary extension of an electromagnetic field resonance field while realizing the objective of wireless power transmission.

It is possible to suppress radiation electromagnetic noise, enhance electromagnetic compatibility, and suppress unfavorable effects on human bodies or peripheral apparatuses, by using a fractal-shaped device.

BRIEF DESCRIPTION OF THE DRAWINGS

FIG. 1 is a circuit diagram of a wireless power transmission apparatus according to a first embodiment.

FIG. 2 is a circuit diagram in which a power transmitting device np and a power receiving device ns have been replaced with the corresponding equivalent circuits.

FIGS. 3(a) to 3(e) are diagrams illustrating an example line conductor pattern of a device having a fractal shape.

FIGS. 8(a) to 8(d) illustrate so-called Sierpinsky gasket patterns based on a line-segment set.

FIGS. 9(a) to 9(e) are diagrams illustrating line conductor patterns based on so-called Koch curves.

FIGS. 10(a) to 10(d) are diagrams illustrating line conductor patterns using three-dimensional Peano curves.

DETAILED DESCRIPTION

The advantage of a wireless power transmission apparatus based on a "DC resonance method", which is one of the features of the present disclosure, will be described before describing a specific embodiment of the present disclosure.

Figure 29:
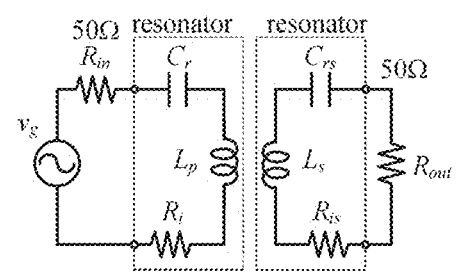
FIG. 29 is an equivalent basic circuit diagram of an existing low-power-efficiency system as a comparative example.

FIG. 29 is an equivalent basic circuit diagram of an existing low-power-efficiency system as a comparative example. In a power transmitter, a resonator circuit made of a capacitor Cr, an inductor Lp, and a resistor Ri is formed in a power transmitter and a resonator circuit made of a capacitor Crs, an inductor Ls, and a resistor Ris is formed in a power receiver. Each of the inductors Lp and Ls is formed of a loop or spiral coil.

Compared with this, in a DC resonance method according to the present disclosure, a resonant device is directly connected to a DC voltage power supply and a switching circuit. As a result, loss associated with power transmission becomes very small and conversion efficiency from power-supply power into resonance-field energy becomes very small compared with the existing system. Further, it becomes easy to apply this to a new use for wireless power transmission in which many resonant devices are utilized, since the efficiency in the conversion of the power of a power-supply into a resonance field is high.

The switching circuit in the DC resonance method uses a sophisticated circuit technology such as an "optimum zero-voltage switching (ZVS) operation" which is useful in, for example, a class D inverter having very small power loss such as switching loss in high-speed switching operations. With this circuit configuration, the ouput impedance becomes approximately 0 Ω. There is almost nothing that consumes energy except for an equivalent internal resistance, and almost no electromagnetic field energy is consumed.

However, a wireless power transmission apparatus based on the DC resonance method is different from a wireless power transmission apparatus in which a 0 Ω class D inverter or a class E inverter is simply used. A class D inverter or a class E inverter is treated such that the load seen from a power transmitter can be thought to be an approximately fixed pure resistor of 50 Ω. Basically, appropriate resonance is generated and power can be supplied to a load only when the load is 50 Ω.

On the other hand, a load as seen from the power transmitter is not fixed in wireless power transmission. In other words, an apparent load changes in accordance with the coupling state. Further, the power consumption of the load also changes. Hence, in the DC resonance method according to the present disclosure, resonance is activated by using DC power through operations at a switching frequency at which the reactance of the load impedance as seen from the power transmitter becomes zero. As a result, impedance matching becomes unnecessary.

The wireless power transmission apparatus of the present disclosure is characterized in that the system configuration is simpler and the total power efficiency is higher than in an existing system based on a magnetic resonance method and, further, the power transmission efficiency does not decrease considerably even when the load considerably changes due to the fact that the transmission distance changes or more than one power transmission destination exists.

The advantage of using a "fractal device" which is one of the characteristics of the present disclosure will be described below on the basis of the embodiments.

First Embodiment

FIG. 1 is a circuit diagram of a wireless power transmission apparatus according to a first embodiment. FIG. 2 is a circuit diagram in which a power transmitting device np and a power receiving device ns have been replaced with the corresponding equivalent circuits.

The characteristics of the wireless power transmission apparatus illustrated in FIG. 1 and FIG. 2 are as follows.
  Configuration in which fractal-shaped devices are used for power transmitting and receiving devices
  Configuration in which wireless power transmission is performed as a result of generation of electromagnetic field resonance coupling realized by a switching technique
  Configuration in which a resonant current is generated in a compound resonant circuit including power transmitting and receiving devices as a result of DC power being intermittently provided to the compound resonant circuit through on/off switching of switching devices
  Configuration in which switching devices perform a zero-voltage switching (ZVS) operation Each of the power transmitting device np and the power receiving device ns, when viewed as a geometric figure, is a fractal-shaped device formed of line conductor patterns in which a portion is similar to the whole. First, the configurations of the power transmitting device np and the power receiving device ns will be illustrated by referring to FIGS. 3(a) to 3(e). FIGS. 3(a) to 3(e) are diagrams illustrating an example line conductor pattern of a device having a fractal shape. FIG. 3(a) illustrates a pattern when the number n of steps (generations) is 1 (n=1), FIG. 3(b) illustrates a pattern when n=2, FIG. 3(c) illustrates a pattern when n=3, FIG. 3(d) illustrates a pattern when n=4, and FIG. 3(e) illustrates a pattern when n=5. These patterns are also patterns obtained by recursively performing an operation of replacing each line segment with a similar shape of a generator, where the generator is the fundamental shape illustrated in FIG. 3(a).

Each of the examples of FIGS. 3(a) to 3(e) is a "space-filling curve" that fills an extending surface with a continuous curve proposed by J. Peano (1853-1932), who was a mathematician. Here, it can be said that the "space-filling curve" is a curve that covers an extending surface by passing through all the regions without crossing itself where the regions are obtained by dividing (equal division) the extending surface. In other words, there exists a regularity in which the divided regions and the corresponding portions of the curve have a one-to-one correspondence. As a result, when seen as a geometrical figure, this becomes a fractal shape in which "a portion is similar to the whole". The curve illustrated in FIGS. 3(a) to 3(e) is one of the space filling curves devised in 1891 by David Hilbert, who was a German mathematician, and is called the Hilbert curve. The Hilbert curve, in two dimensions, is a curve that passes through all the points while always connecting regions neighboring each other to each other in $2^n$ square regions (grid). For example, in the case of 64×64 grid pieces ($2^6$ square), a Hilbert curve, where the number of steps is 5, passes through all the grid pieces.

Note that a "space-filling curve" is generally called a Peano curve in a broad sense even in the case where the curve was not proposed by Peano himself.

Figure 4:
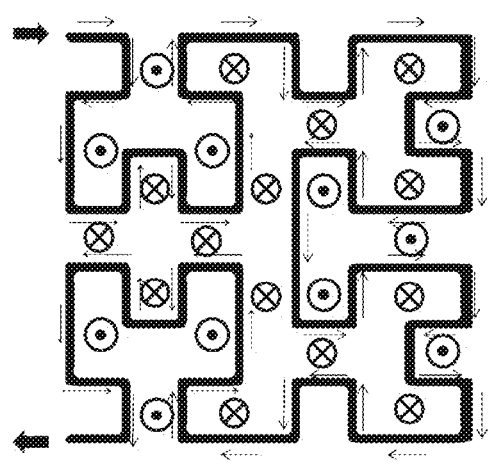
FIG. 4 is a diagram illustrating the directions of a current flowing through the line conductor pattern of the power transmitting device np and the power receiving device ns and the directions of magnetic flux distributed along the line conductor pattern.

FIG. 4 is a diagram illustrating the directions of a current flowing through the line conductor pattern of the power transmitting device np and the power receiving device ns described above and the directions of magnetic flux distributed along the line conductor pattern. In this example, the structures of the power transmitting device np and the power receiving device ns are the same. The arrows in FIG. 4 illustrate momentary directions of a magnetic flux vector.

In the fundamental shape element (the shape when the number of steps n=1), the magnetic flux exists locally and, hence, local self inductances that cause induced voltages to cancel one another out are distributed on the surface. Hence, as the number of steps n increases, regions where the polarity of a magnetic field is reversed are intermixed and differential coil structures are formed everywhere. As a result, magnetic flux locally closes and is unlikely to be distributed to positions far from the device. In other words, lines of magnetic flux coupled to each other at various portions are closed near the power transmitting device np and the power receiving device ns, and are not diffused. The power transmission efficiency becomes maximum when the line conductor patterns of the power transmitting device np and the power receiving device ns face each other.

Figure 5:
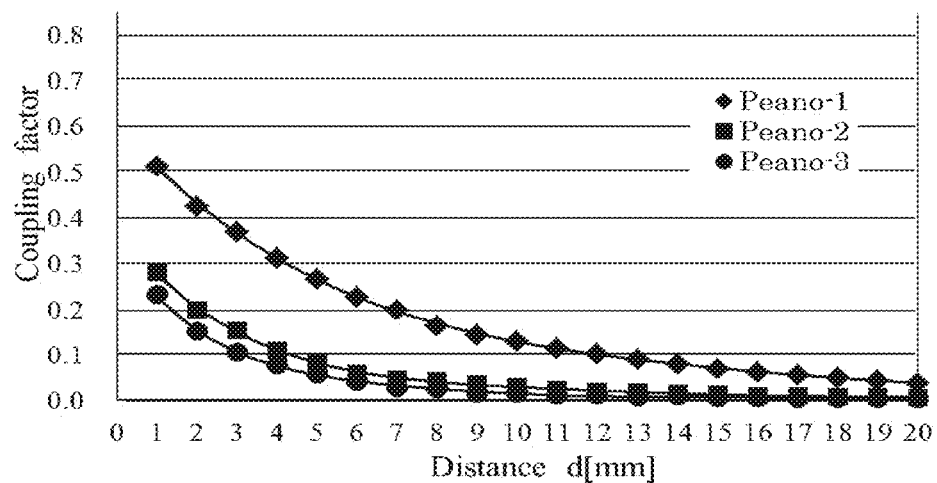
FIG. 5 is a diagram illustrating the relationship between a coupling factor and the distance between the power transmitting device np and the power receiving device ns.

FIG. 5 is a diagram illustrating the relationship between the coupling factor and the distance between the power transmitting device np and the power receiving device ns. Here, the characteristics lines illustrate the characteristics for line conductor patterns with different numbers of steps. "Peano-1", "Peano-1", and "Peano-1" are Peano curves respectively for the number of steps n=2, the number of steps n=3, and the number of steps n=4. Space division patterns and the paths passing through them are those illustrated in FIGS. 3(a) to 3(e).

As is clear from FIG. 5, the larger the number of steps (the higher the order), the higher the attenuation in the coupling factor for the distance between the power transmitting device np and the power receiving device ns. In this manner, a fractal-shaped device in which the line conductor is Peano-shaped is suitable for short-distance power transmission.

Note that the fractal-shaped device like this is characterized by confining an electromagnetic field under a specific condition in a range higher than or equal to a GHz band and this characteristic may also be utilized.

Figure 6:
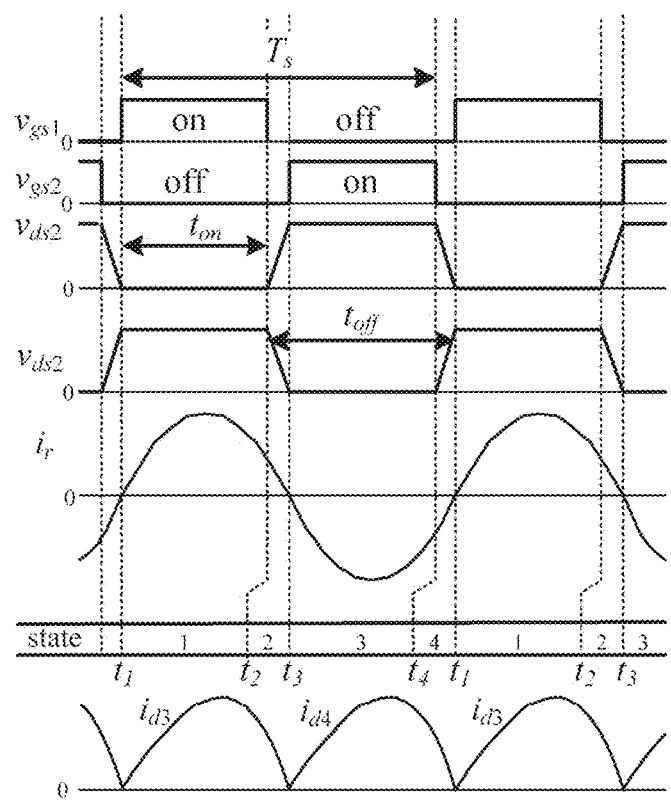
FIG. 6 is a waveform diagram of the portions illustrated in FIG. 1 and FIG. 2.
Figure 7A:
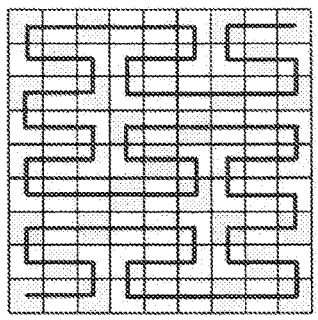
FIGS. 7 (A) to (E) illustrate line conductor patterns based on Peano curves having different fundamental shapes, and illustrate patterns corresponding to respective numbers of steps.
Figure 7D:
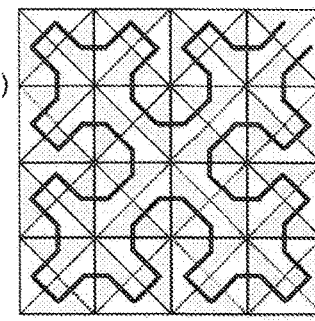
Figure 7B:
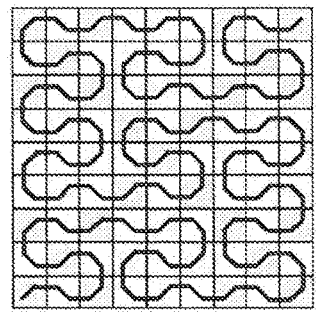
Figure 7E:
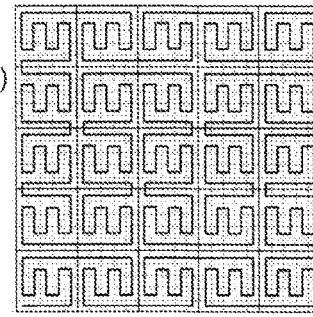
Figure 7C:
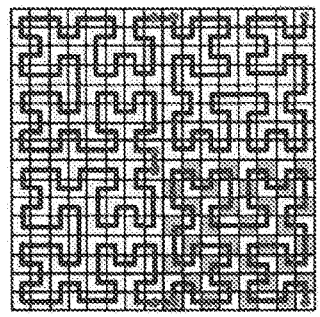

Next, the detailed operations of the wireless power transmission apparatus illustrated in FIG. 1 and FIG. 2 will be described with reference to FIG. 6. FIG. 6 is a waveform diagram of the portions illustrated in FIG. 1 and FIG. 2.

The mutual inductance of the power transmitting device np is denoted by Lm, the leakage inductance of the power transmitting device np is denoted by Lr, the mutual inductance of the power receiving device ns is denoted by Lms, and the leakage inductance of the power receiving device ns is denoted by Lrs. Further, the gate-source voltages of switch devices Q1 and Q2 are denoted by vgs1 and vgs2 and the drain-source voltages thereof are denoted by vds1 and vds2.

The switch devices Q1 and Q2 are alternately switched on and off with a short dead time therebetween at which the two switches are off, and perform a ZVS operation by commutating the currents flowing through Q1 and Q2 during the dead time. Operations in respective states during one switching period are as follows.

(1) State 1, time t1-t2

First, a diode Dds1 is turned on. During the on period of the diode Dds1, a ZVS operation is performed by turning on the switch device Q1, and the switch device Q1 enters the on state. The equivalent mutual inductances Lm and Lms and a mutual capacitance Cm are formed between the power transmitting device np and the power receiving device ns through mutual induction. In a compound resonant circuit formed of Cr, Lr, Lm, Lms, Crs, and Lrs, a power transmitting resonant circuit and a power receiving resonant circuit resonate, resonant currents flow through the mutual inductances Lm and Lms, electromagnetic resonant coupling is formed, and power is transmitted from a power transmitting circuit to a power receiving circuit. On the power transmitting side, a resonant current flows through the capacitor Cr and the leakage inductance Lr. On the power receiving side, a resonant circuit flows through the capacitor Crs and the leakage inductance Lrs and is rectified by switch devices Q3 and Q4, such that power is supplied to a load.

When the switch device Q1 is turned on, state 2 is entered.

(2) State 2, time t2-t3

On a power transmitter Txp side, a current it which was flowing through the leakage inductance Lr charges a parasitic capacitor Cds1, and a parasitic capacitor Cds2 is discharged. When the voltage vds1 becomes a voltage Vi, and the voltage vds2 becomes 0 V, a diode Dds2 performs conduction and a state 3 is entered.

(3) State 3, time t3-t4

First, the diode Dds2 performs conduction. As a result of the switch device Q2 being turned on during the conduction period of the diode Dds2, a ZVS operation is performed, and the switch device Q2 performs conduction. Equivalent mutual inductances Lm and Lms are formed between the power transmitting device np and the power receiving device ns through mutual induction. In the compound resonant circuit formed of Cr, Lr, Lm, Lms, Crs, and Lrs, the power transmitting resonant circuit and the power receiving resonant circuit resonate, resonant currents flow through the mutual inductances Lm and Lms, electromagnetic field resonant coupling is formed, and power is transmitted from the power transmitting circuit to the power receiving circuit. On the power transmitting side, a resonant current flows through the capacitor Cr and the leakage inductance Lr. On the power receiving side, a resonant circuit flows through the capacitor Crs and the leakage inductance Lrs and is rectified by the switch devices Q3 and Q4, such that power is supplied to the load.

When the switch device Q2 is turned off, state 4 is entered.

(4) State 4, time t4-t1

On the power transmitter Txp side, a current it which was flowing through the leakage inductance Lr discharges the parasitic capacitor Cds1, and the parasitic capacitor Cds2 is charged. When the voltage vds1 becomes 0 V, and the voltage vds2 becomes Vi, the diode Dds1 performs conduction and state 1 is entered again.

Hereinafter, states 1 to 4 are periodically repeated.

Note that in the example illustrated in FIG. 1, a switching control circuit 20 is configured to detect a current flowing through the power receiving device ns and turn the switch devices Q3 and Q4 on and off alternately. However, a configuration may be employed in which the switching control circuit 20 transmits the switching timing signal for the switch devices Q1 and Q2 on the power transmitter side from the power transmitter Txp to a power receiver Rxp, and the switch devices Q3 and Q4 are driven in synchronization with the switching timing of the switch devices Q1 and Q2 on the power receiver Rxp side.

The power transmitter described above, together with the power transmitting device np, forms a power transmitting resonant circuit, and causes the power transmitting resonant circuit to generate a resonant current through input of the DC power supply Vi. As a result, an electromagnetic resonance field is generated.

The resonance field is formed in a range within 1/5 of the product of a switching period Ts [sec], which is the inverse of a switching frequency fs, and the speed of light (about 300 thousand (km/s)) from the power transmitting device np, a resonant device nsm, or the power receiving device ns. In other words, the resonance field is formed within a range of 1/5 of the wavelength from each device. For example, when the switching frequency is 10 MHz, the wavelength is about 30 m, and wireless power transmission can be performed within a range of about 6 m, which is one fifth of the wavelength.

By employing the fractal-shaped device of the present disclosure, the following advantages are provided.

The fundamental shape element (shape in the case where the number of steps n=1) functions as a differential coil and, hence, it is possible to suppress unnecessary extension of an electromagnetic field resonance field and to store electromagnetic field energy.

Since an area per line length is small, the device can be reduced in size.

Compared with a simple rectangular coil (or round coil), the self impedance of the whole fractal device becomes small. Hence, reducing the size for obtaining a desired inductance is not required and predetermined coupling between devices spaced apart from each other to some extent is obtained.

Magnetic flux is localized in the case of the fundamental shape element and, hence, localized self inductances that cause induced voltages to cancel one another out are distributed. This configuration has an advantage in that it becomes possible to set conditions appropriate for exciting a resonance phenomenon by, for example, connecting an external capacitance while reducing an apparent self inductance.

Since magnetic flux closes locally within a fundamental element, magnetic flux is unlikely to extend to positions far from the device.

Control of magnetic energy distribution within a coil is possible by appropriately setting the relative arrangement of devices facing each other, through making the most of the shape of the devices.

The advantages of a power transmission system including the wireless power transmission apparatus of the present disclosure are as follows.

A wireless power transmission system with reduced power loss can be formed through direct conversion between DC electric energy and electromagnetic field energy.

Electromagnetic field energy can be obtained from a DC power supply.

DC power can be obtained from electromagnetic field energy by providing a rectifying circuit in a load circuit.

Wireless power transmission from DC power to DC power is possible.

A simple wireless power transmission apparatus can be formed.

Transmission power can be controlled by a switching control circuit that controls switching operations.

Power loss of switching devices can be considerably reduced as a result of the switching devices performing a ZVS operation.

Second Embodiment

In a second embodiment, a number of examples of the line conductors of the fractal-shaped device will be illustrated.

FIGS. 7 (A) to (E) illustrate line conductor patterns based on Peano curves having different first-step shapes, and illustrate patterns corresponding to the respective numbers of steps.

FIGS. 8(a) to 8(d) illustrate so-called Sierpinsky gasket patterns based on a line-segment set. FIGS. 8 (a), 8(b), 8(c), and 8(d) illustrate line conductor patterns respectively corresponding to the cases where the number of steps n=1, 2, 3, and 4.

AS described above, the line conductor patterns may have fractal shapes whose external shapes are triangular.

FIGS. 9(a) to 9(e) are diagrams illustrating line conductor patterns based on so-called Koch curves. FIGS. 9(a), 9(b), 9(c), 9(d), and 9(e) illustrate respective line conductor patterns corresponding to the cases where the number of steps n=0, 1, 2, 3, and 4.

As described above, the line conductor patterns may have polygonal-line fractal shapes. By employing a polygonal line, line conductor patterns can be formed in a region extending in the longitudinal direction.

Alternatively, a Koch snow-flake line conductor pattern, starting from a triangle and concatenating three sets of line segments illustrated in FIG. 9, may be formed. With this structure, radiation of electromagnetic noise to the outside can be suppressed.

FIGS. 10(a) to 10(d) are diagrams illustrating line conductor patterns using three-dimensional Peano curves. FIGS. 10(a), 10(b), and 10(c) are patterns corresponding to the cases in which the number of steps n=1, 2, and 3. Note that in FIG. 10(d), the thickness of the line conductors is also three-dimensionally represented.

As described above, the line conductor patterns may have fractal shapes whose external shapes are approximately cubes.

Third Embodiment

In a switching control circuit of a wireless power transmission apparatus according to a third embodiment, an operation is performed such that the switching frequency fs is near the resonant frequency fa (fs=fr±30%), where fa denotes a resonant frequency that makes X=0, X denoting the reactance of an input impedance in the case where the whole load side is seen from a power transmitting resonant circuit connected to a power transmitting switching circuit.

Figure 11:
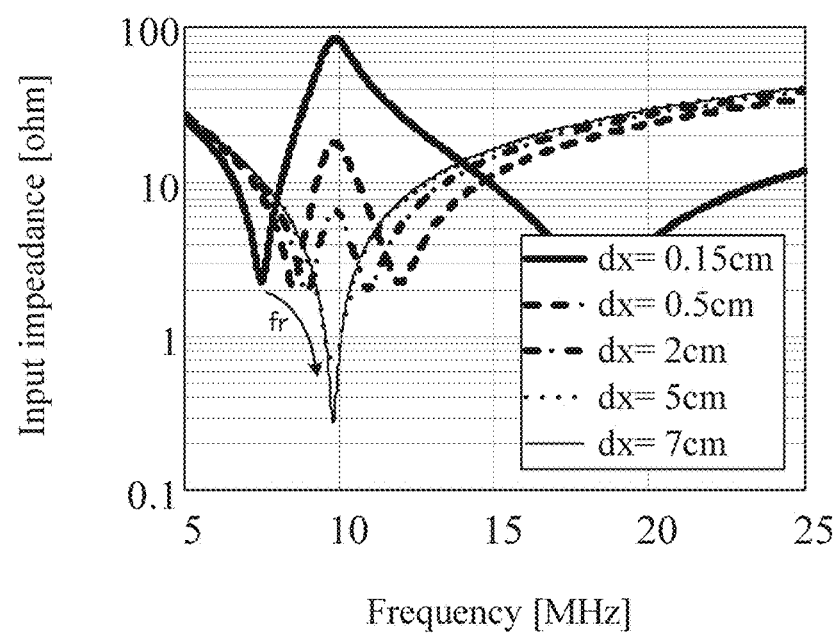
FIG. 11 is diagram illustrating the frequency characteristics of the input impedance of a wireless power transmission apparatus according to a third embodiment in the case where the whole load side is seen from the input of a power transmitting resonant circuit.

FIG. 11 is diagram illustrating the frequency characteristics of the input impedance of the wireless power transmission apparatus according to the third embodiment in the case where the whole load side is seen from the input of a power transmitting resonant circuit. Here, the resonant capacitors Cr and Crs have capacitances that make the resonant frequency be near 10 MHz. When a load resistance Ro=10 Ω, and a distance dx is changed like 0.15, 0.5, 2.0, 5.0, and 7.0 cm, the input impedance and the resonant frequency fr at which the input impedance becomes minimal change as illustrated by an arrow in the figure.

For example, when the power transmission distance dx=7 cm (70 mm), the resonant frequency fr≈10 MHz and, hence, the switching frequency fs is made to be, for example, 10 MHz.

By performing an operation such that the switching frequency fs is near the resonant frequency fa, as described above, an electromagnetic resonance field can be formed. At the resonant frequency, the resonant energy of an electromagnetic field is increased such that the amount of power transmission of the electromagnetic field energy is increased. As a result, a large amount of power can be transmitted to a position more spaced apart from the device. In addition, higher efficiency and a reduction in the size and weight of the wireless power transmission apparatus can be realized.

Fourth Embodiment

A switching control circuit of a wireless power transmission apparatus according to a fourth embodiment allows an operation in a state in which the resonant frequency fr is lower than the switching frequency fs. In other words, the input impedance of the compound resonant circuit as seen from the switching circuit is made to be inductive.

Figure 12:
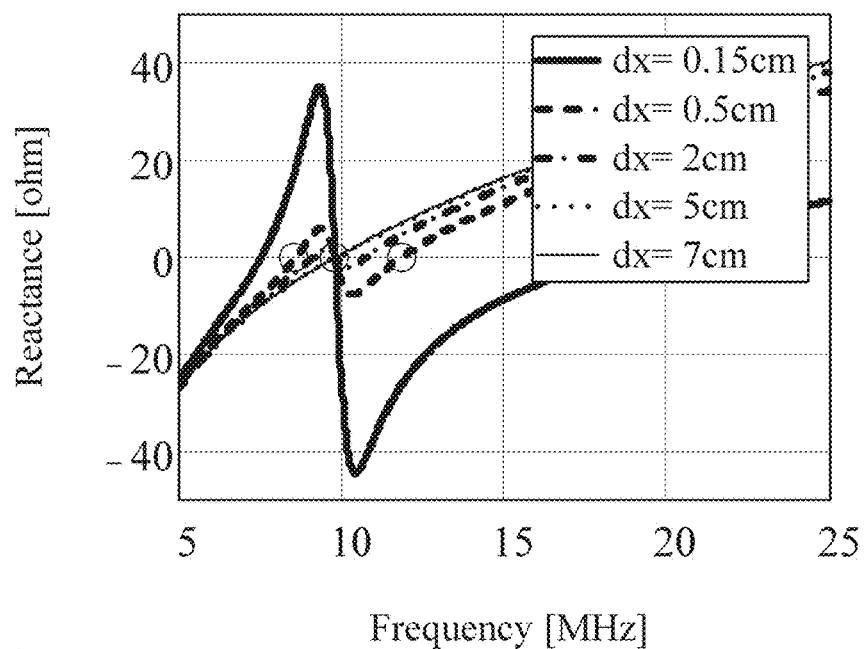
FIG. 12 is a diagram illustrating the frequency characteristics of the reactance of an input impedance when the whole load side is seen from the input of a power transmitting resonant circuit in a wireless power transmission apparatus according to a fourth embodiment.

FIG. 12 is a diagram illustrating the frequency characteristics of the reactance of the input impedance when the whole load side is seen from the input of the power transmitting resonant circuit in the wireless power transmission apparatus according to the fourth embodiment. Here, the resonant capacitors Cr and Crs have capacitances that make the resonant frequency be near 10 MHz. When a load resistance Ro=10 Ω and the distance dx is changed like 0.15, 0.5, 2.0, 5.0, and 7.0 cm, the reactance changes as illustrated in FIG. 10.

As the distance dx increases, it can be seen that double-peak characteristics with three frequencies at which the reactance becomes zero and with two locally maximum values change to single-peak characteristics having a single frequency at which the reactance becomes zero. When focusing on the reactance of the input impedance, it can be seen that inductiveness and capacitiveness are swapped with each other at three frequencies. The three circles in FIG. 12 indicate frequencies at which inductiveness and capacitiveness are swapped with each other when dx=0.5 cm. To realize a ZVS operation, it is necessary to make the input impedance be reactive and generate a current whose waveform is lagging a voltage waveform. This lagging current charges and discharges the parasitic capacitors Cds1 and Cds2 of the switch device (FET) during a dead time. Hence, for example, in double-peak characteristics with strong magnetic coupling, the operation switching frequency fs needs to be within a frequency range in which the input impedance is inductive.

As a result of setting the switching frequency in this way, it becomes possible to perform the ZVS operation of the switching device over the whole load range. Hence, power loss of the switching device is considerably reduced. Further, by reducing the switching loss, high efficiency is realized and the wireless power transmission apparatus can be reduced in size and weight.

Fifth Embodiment

Figure 13:
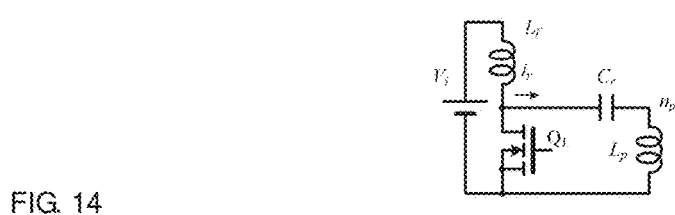
FIG. 13 is a circuit diagram of a power transmitter in a wireless power transmission apparatus according to a fifth embodiment.

FIG. 13 is a circuit diagram of a power transmitter in a wireless power transmission apparatus according to a fifth embodiment. The example of FIG. 13 includes an inductor Lf having an inductance that is large enough to create, from the input DC voltage, a current source which can supply a current relatively thought to be a DC current compared with an AC current made to flow through the power transmitting device np, and includes only the single switch device Q1 on the power transmitting side. The inductance of the inductor Lf is sufficiently larger than the inductance of the power transmitting device np, and becomes a high impedance at the switching frequency. The variation in a flowing current is sufficiently small.

Figure 14:
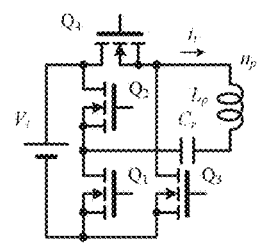
FIG. 14 is a circuit diagram of a power transmitter in another wireless power transmission apparatus according to a fifth embodiment.

FIG. 14 is a circuit diagram of a power transmitter in another wireless power transmission apparatus according to a fifth embodiment. In the example illustrated in FIG. 14, a bridge circuit formed of four switch devices Q1-Q4 is formed. The switch devices Q1 and Q4 are switched on/off together, and the switch devices Q2 and Q3 are switched on/off together. The switch devices Q1 and Q2 are alternately switched on/off. In this way, a configuration may be employed in which the power transmitting switching circuit has a full-bridge configuration and a resonant current is generated by alternately switching on/off pairs of switch devices among four switch devices connected so as to form a bridge.

As described above, as a result of the switch devices on the power transmitter side having a bridge configuration, voltages applied to the switch devices are reduced, resulting in an enhanced efficiency and reduction in the size and weight of the wireless power transmission apparatus.

Sixth Embodiment

FIG. 15(A) to FIG. 19(B) are circuit diagrams of a power receiver in a wireless power transmission apparatus according to a sixth embodiment.

Figure 15A:
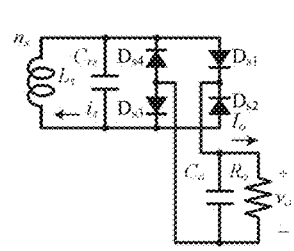
FIG. 15 (A) and FIG. 15 (B) are circuit diagrams of a power receiver in a wireless power transmission apparatus in which a power receiving side rectifier circuit is formed of a bridge circuit including diodes Ds1, Ds2, Ds3, and Ds4.
Figure 15B:
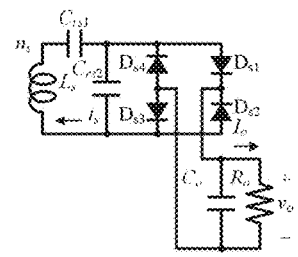

In the examples of FIG. 15 (A) and FIG. 15 (B), a power receiving side rectifier circuit is formed of a bridge circuit including diodes Ds1, Ds2, Ds3, and Ds4. In the example illustrated in FIG. 15 (B), a configuration is employed in which two resonant capacitors Crs1 and Crs2 are provided and a divided voltage obtained by a voltage divider formed of the two resonant capacitors Crs1 and Crs2 is rectified.

Figure 16A:
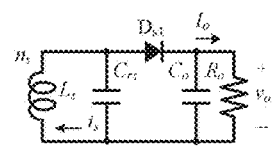
FIG. 16 (A) and FIG. 16 (B) are circuit diagrams of a power receiver in a wireless power transmission apparatus in which the power receiving side rectifier circuit is formed of a half-wave rectifier.
Figure 16B:
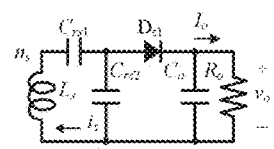

In the examples illustrated in FIG. 16 (A) and FIG. 16 (B), the power receiving side rectifier circuit forms a half-wave rectifier circuit. A current flowing through a resonant capacitor Crs is rectified by a diode Ds1 and supplied to a load. The example illustrated in FIG. 16 (B) is configured such that the two resonant capacitors Crs1 and Crs2 are provided and a divided voltage obtained by a voltage divider formed of the two resonant capacitors Crs1 and Crs2 is rectified.

Figure 17A:
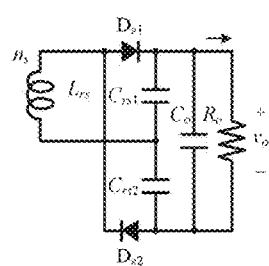
FIG. 17 (A) and FIG. 17 (B) are circuit diagrams of a power receiver in a wireless power transmission apparatus in which the power receiving side rectifier circuit is formed of a voltage doubling rectifier circuit.
Figure 17B:
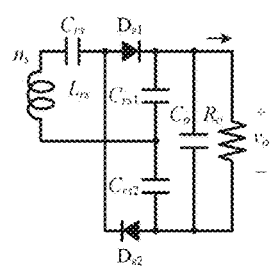

In the examples illustrated in FIG. 17 (A) and FIG. 17 (B), the power receiving side rectifier circuits form a voltage doubling rectifier circuit. The diodes Ds1 and Ds2 rectify currents flowing through the resonant capacitors Crs1 and Crs2 and supply a double voltage to a load. The example of FIG. 15 (B) is configured such that three resonant capacitors Crs, Crs1, and Crs2 are provided and a divided voltage obtained by these capacitors Crs, Crs1, and Crs2 is rectified.

Figure 18A:
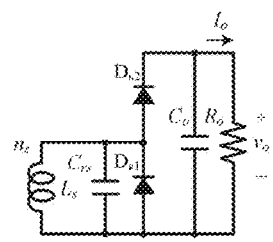
FIG. 18 (A) and FIG. 18 (B) are circuit diagrams of a power receiver in a wireless power transmission apparatus in which the power receiving rectifier circuit is formed of a voltage doubling rectifier circuit.
Figure 18B:
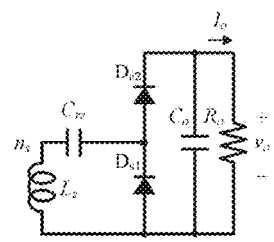

In the examples illustrated in FIG. 18 (A) and FIG. 18 (B), the power receiving rectifier circuits form a voltage doubling rectifier circuit. The diodes Ds1 and Ds2 perform voltage doubling rectification for a current flowing through the resonant capacitor Crs and provide a double voltage to a load.

Figure 19A:
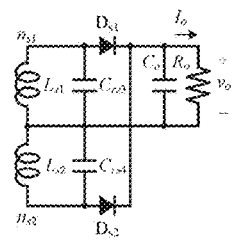
FIG. 19 (A) and FIG. 19 (B) are circuit diagrams of a power receiver in a wireless power transmission apparatus in which the power receiver is configured to include power receiving devices ns1 and ns2 having a center tap.
Figure 19B:
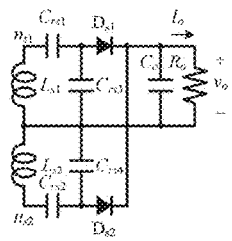

In the examples of FIG. 19 (A) and FIG. 19 (B), the power receiver includes power receiving devices ns1 and ns2. Rectifier circuits are respectively provided for the two power receiving devices ns1 and ns2. As a result, a center-tap rectifier circuit is formed. The power receiving devices ns1 and ns2 need not be provided by providing the center tap. Two loop coils may be connected in series. Further, these two loop coils need not be coupled to each other and, hence, the power receiving devices ns1 and ns2 may be orthogonal to each other. As a result, the range (directivity) of an azimuth angle at which the power transmitting device np and the power receiving devices ns1 and ns2 can be coupled to one another is widened. The example of FIG. 19 (B) has a configuration in which two resonant capacitors Crs1 and Crs3 are connected to the power receiving device ns1, and a divided voltage obtained by these two resonant capacitors Crs1 and Crs2 is rectified. Similarly, in this configuration, two resonant capacitors Crs2 and Crs4 are connected to the power receiving device ns2, and a divided voltage obtained by these two resonant capacitors Crs2 and Crs4 is rectified.

Seventh Embodiment

In a seventh embodiment, a wireless power transmission apparatus including a field resonator that includes at least one resonant device that is arranged in a space in a near-field in which a power transmitting device and a power receiving device exist is described.

Figure 20:
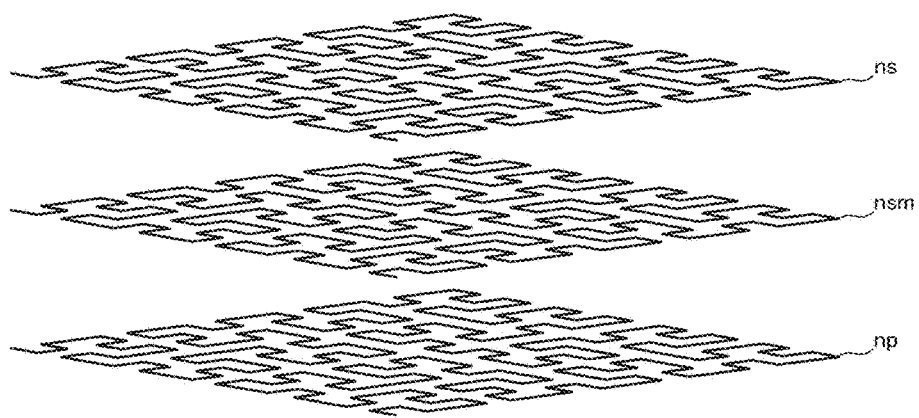
FIG. 20 is a diagram illustrating how a resonant device nsm is arranged between the power transmitting device np and the power receiving device ns.
Figure 21:
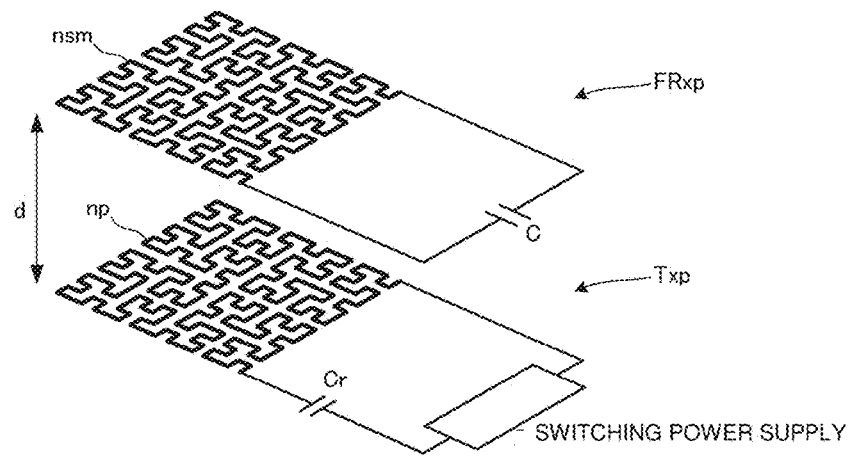
FIG. 21 is a diagram illustrating a state in which a field resonator is arranged in the vicinity of a power transmitter.

FIG. 20 is a diagram illustrating how the resonant device nsm is arranged between the power transmitting device np and the power receiving device ns. FIG. 21 is a diagram illustrating a state in which a field resonator FRxp is arranged in the vicinity of the power transmitter Txp. The resonant device nsm has the same configuration as the power transmitting device np and the power receiving device ns. The circuits connected to the power transmitting device np and the power receiving device ns are the same as those illustrated in FIG. 1 and FIG. 2. A capacitor C is connected to the resonant device nsm. The resonant device nsm and the capacitor C form a resonant circuit. In this resonant circuit, the inductive impedance and the capacitive impedance of the resonant device nsm and the capacitor C form a resonant circuit.

The resonant device nsm, when seen as a geometric figure, is a fractal-shaped device formed of a line conductor pattern in which a portion is similar to the whole, and enhances electromagnetic field energy in the vicinity.

Figure 22:
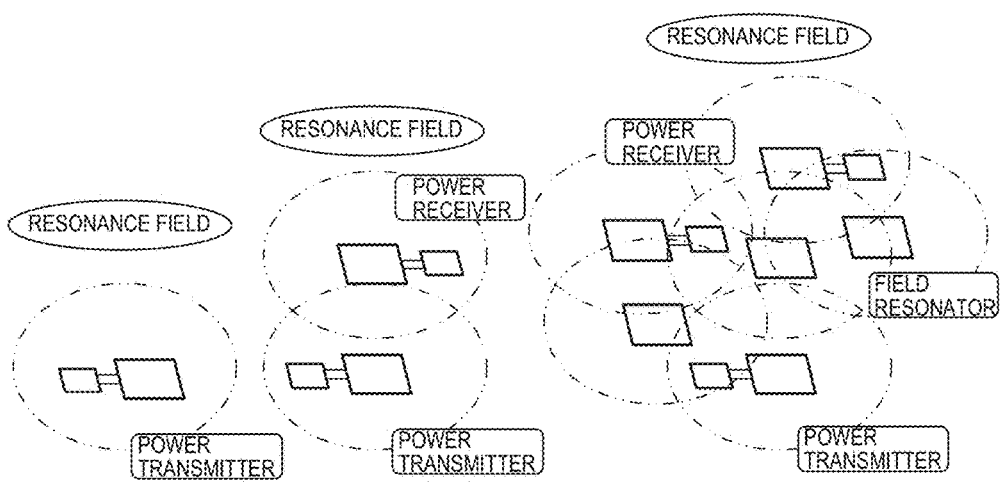
FIG. 22 is a conceptual diagram illustrating how an electromagnetic resonance field is extended.

FIG. 22 is a conceptual diagram illustrating how an electromagnetic resonance field is extended. First, a power transmitter creates an electromagnetic resonance field from a DC voltage. When a power receiver is placed in this electromagnetic resonance field, the power receiver extends the electromagnetic resonance field. When a field resonator is placed in this electromagnetic resonance field, the electromagnetic resonance field is further extended. In other words, the resonant device nsm not only generates a resonant current by obtaining electric energy from a resonance field created by the power transmitting device np, but also forms (extends) an electromagnetic resonance field, using this resonant current. When the field resonator is placed in this electromagnetic resonance field, the electromagnetic resonance field is further extended. The power transmitter, the power receiver, and the field resonator exist in the near-field in the power transmission frequency.

The advantages of a wireless power transmission apparatus including a field resonator are as follows.

An electromagnetic resonance field can be extended by using a resonant device.

A transmission distance can be increased by a resonant device.

An external resonant capacitor is not needed as a used as a resonant capacitor.

A region with a comparatively high magnetic flux density can be formed over the whole surface of a resonant device.

Since a region with high magnetic flux density distribution is generated in the vicinity of a resonant device, the region with high magnetic flux density distribution can be concentrated in a specific space in accordance with the arrangement of this resonant device.

The maximum value of the magnetic flux density, for example, becomes four times that in the case where the resonant device is not used. By using the resonant device, the distance between a transmitting device or a power receiving device and the resonant device is reduced by 50% and energy due to magnetic flux becomes about four times that in the case without the resonant device, considering that electromagnetic field energy is decreased in inverse proportion to the square of the distance.

Eighth Embodiment

Figure 23:
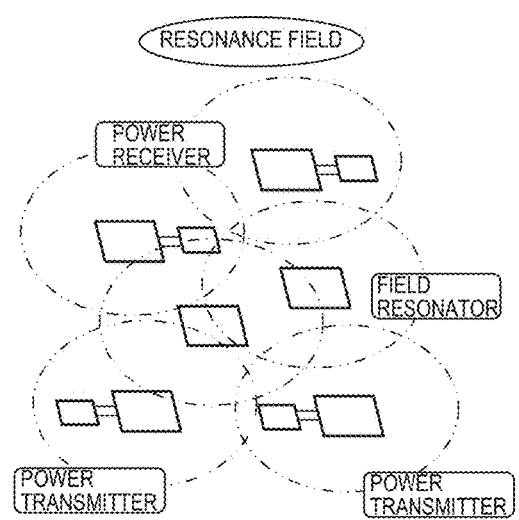
FIG. 23 illustrates an example in which the strength of a resonance field is increased by arranging a plurality of power transmitters and a plurality of power receivers.
Figure 24:
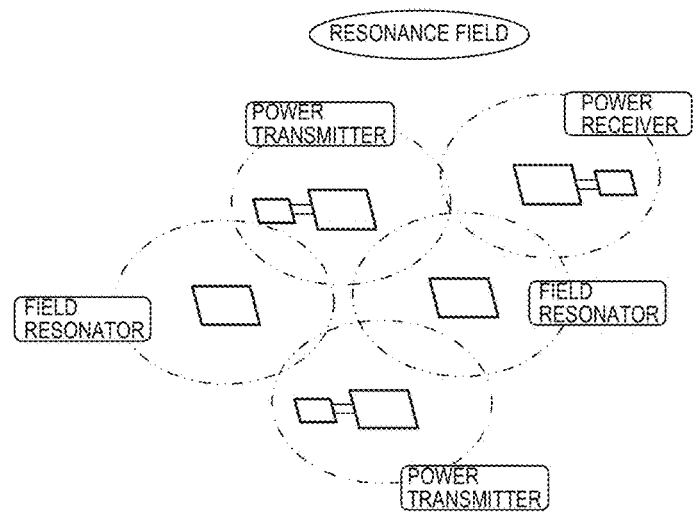
FIG. 24 is a schematic configuration diagram of a wireless power transmission apparatus including a plurality of power transmitters and a plurality of power receivers.

FIG. 23 and FIG. 24 are schematic configuration diagrams of a wireless power transmission apparatus including a plurality of power transmitters and a plurality of power receivers. Specifically, FIG. 23 illustrates an example in which the strength of a resonance field is increased by arranging a plurality of power transmitters and a plurality of power receivers. FIG. 24 illustrates an example in which a resonance field is extended by arranging a plurality of power transmitters and a plurality of power receivers.

As described above, the electromagnetic resonance field can be extended by using a plurality of power transmitters and a plurality of power receivers. In addition, transmission power can be increased by using a plurality of power transmitters. Further, power can be supplied to a plurality of loads spaced apart from one another by using a plurality of power receivers. In addition, the degree of freedom in positions where power receivers can receive power can be increased by extending an electromagnetic resonance field by using a plurality of power transmitters and a plurality of resonant devices.

Ninth Embodiment

Figure 25:
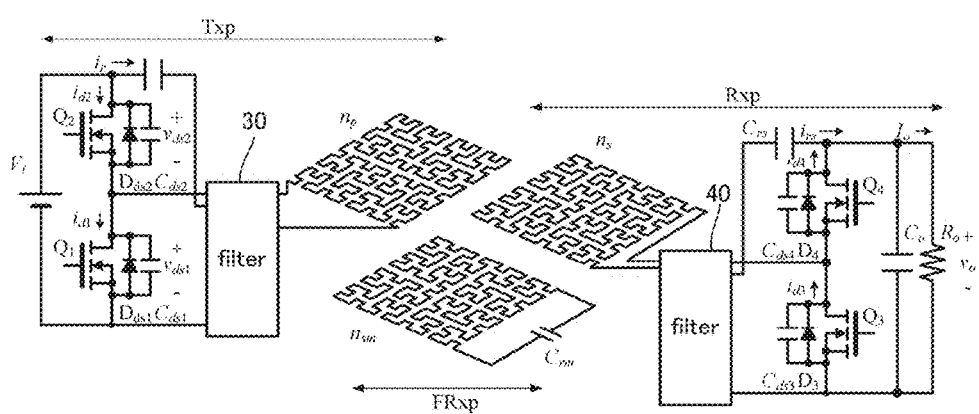
FIG. 25 is a circuit diagram of a wireless power transmission apparatus according to a ninth embodiment.

FIG. 25 is a circuit diagram of a wireless power transmission apparatus according to a ninth embodiment. In this example, a filter 30 is provided between the power transmitting device np and a power transmitting circuit. Further, a filter 40 is provided between the power receiving device ns and a power receiving circuit. The rest of the configuration is the same as that illustrated in FIG. 1.

The filters 30 and 40 are band pass filters that allow the power at a resonant frequency to pass therethrough and remove (reflect) power at frequencies other than the resonant frequency. By using such filters, generation of unnecessary noise is suppressed and, hence, electromagnetic compatibility (EMC) can be achieved as a result of the problem of electromagnetic interference with peripheral devices having been alleviated.

The problem of electromagnetic interference with peripheral devices can be alleviated by using the ISM (Industry-Science-Medical) band as an electromagnetic field resonant frequency. For example, frequencies near 6.7 MHz, 13.5 MHz, or 27.12 MHz are used as the ISM band frequencies.

Tenth Embodiment

Figure 26:
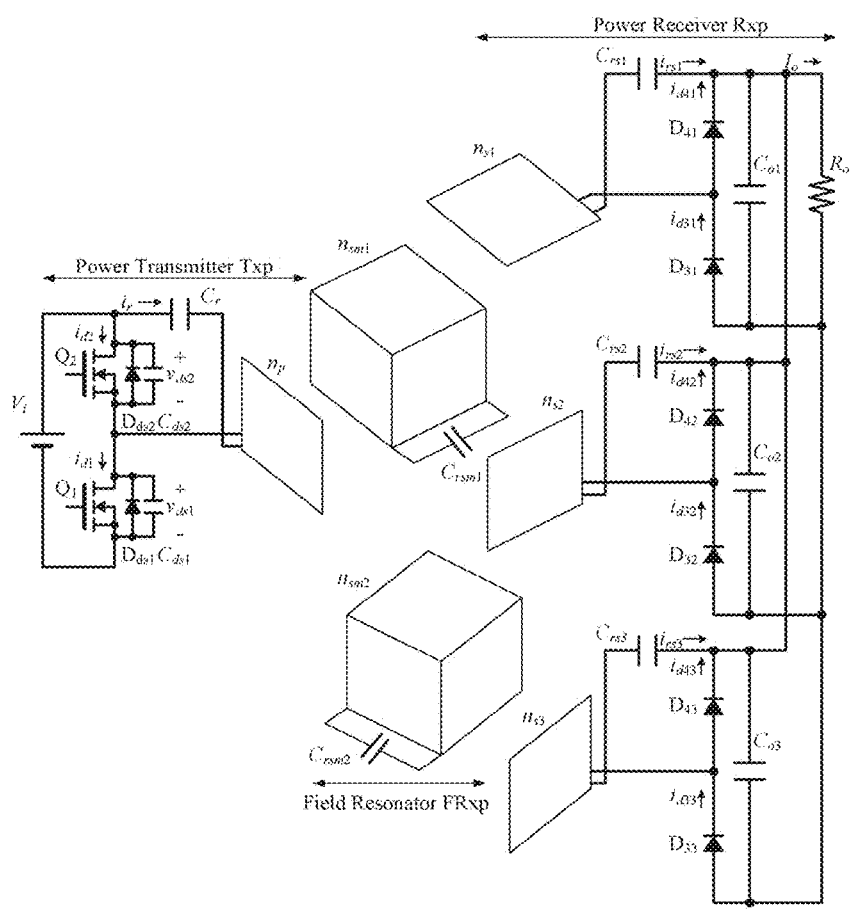
FIG. 26 is a circuit diagram of a wireless power transmission apparatus according to a tenth embodiment.

FIG. 26 is a circuit diagram of a wireless power transmission apparatus according to a tenth embodiment. The wireless power transmission apparatus includes the power transmitter Txp including the power transmitting device np, the field resonator FRxp including the resonant device nsm, and the power receiver Rxp including the power receiving device ns.

The power receiver Rxp includes a set of the power receiving device ns1 and a power receiving circuit including a resonant capacitor Crs1, rectifier diodes D41 and D31, and a smoothing capacitor Co1, a set of the power receiving device ns2 and a power receiving circuit including a resonant capacitor Crs2, rectifier diodes D42 and D32, and a smoothing capacitor Co2, and a set of the power receiving device ns3 and a power receiving circuit including a resonant capacitor Crs3, rectifier diodes D43 and D33, and a smoothing capacitor Co3. A configuration is employed in which the output lines of the three power receiving circuits are connected in parallel so as to supply DC power to a single load Ro.

In this example, the field resonator FRxp formed of a resonant device nsm1 and a resonant capacitor Crsm1 and the field resonator FRxp formed of a resonant device nsm2 and a resonant capacitor Crsm2 are provided.

The resonant devices nsm1 and nsm2 are fractal devices whose external shape is a cube, and are each formed of a conductor pattern which is shaped like, for example, a three-dimensional Hilbert curve illustrated in FIGS. 10(a) to 10(d). The power transmitting device np and the power receiving devices ns1, ns2, and ns3, are conductor patterns each shaped like a Hilbert curve having a square external shape. The external shapes of the power transmitting device np and the power receiving devices ns1, ns2, and ns3 have approximately the same size as a single surface of each of the resonant devices nsm1 and nsm2. The numbers of steps are the same.

In this way, a configuration may be employed in which a plurality of power receiving devices are arranged in different locations and electric energy received by the plurality of power receiving devices is supplied to a load. As a result, power can be supplied to power receiving devices in various three-dimensional directions. Further, the amount of electric energy that can be supplied to a load can be easily increased.

Eleventh Embodiment

Figure 27:
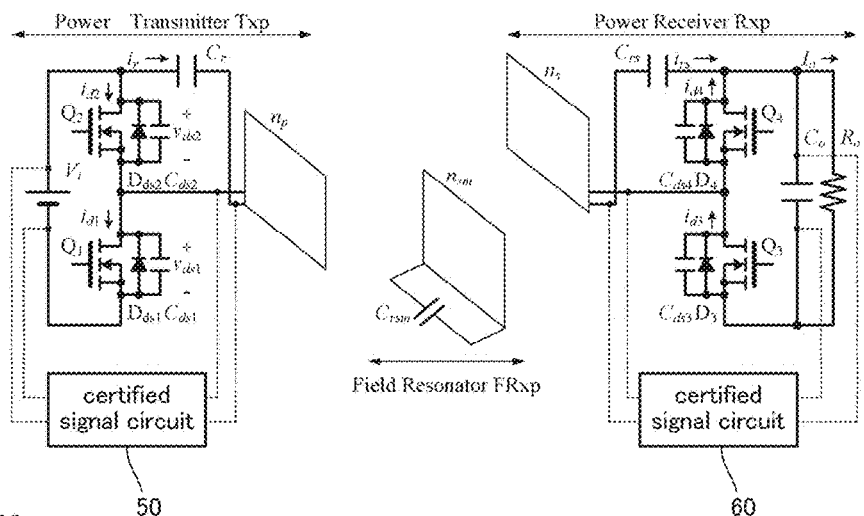
FIG. 27 is a circuit diagram of a wireless power transmission apparatus according to an eleventh embodiment.

FIG. 27 is a circuit diagram of a wireless power transmission apparatus according to an eleventh embodiment. In this wireless power transmission apparatus, a power transmitter includes a communication circuit 50 that operates with an input power supply Vi as a power supply and utilizes the power transmitting device np as a communication coil (near-field antenna). A power receiver includes a communication circuit 60 that operates with a rectifying and smoothing circuit as a power supply and utilizes the power receiving device ns as a communication coil (near-field antenna). In other words, the power transmitting device np and the power receiving device ns play the roles of power transmission and signal communication. As a result, a reduction in the size and weight of the power transmitter can be realized.

Superposition of a communication signal can be performed by making the frequency of power transmission be a carrier frequency and modulating this. Hence, the communication signal is also communicated via an electromagnetic resonance field. This communication allows various data and timing signals to be transmitted from a power transmitter to an appropriate (object) power receiver. Alternatively, this communication allows various data and timing signals to be transmitted from a power receiver to an appropriate (object) power transmitter. For example, various states on the power transmitter side and various states on the power receiver side can be mutually communicated. Further, a power receiver can perform synchronous rectification in synchronization with the switching of a switching device in a power transmitter.

Unlike power transmission, signal transmission does not lead to an increase in loss even with low power transmission efficiency and, hence, the communication signal described above may use a frequency which is independent of the frequency for power transmission.

In the example illustrated in FIG. 27, the communication circuits 50 and 60 are respectively provided in a power transmitter and a power receiver. However, the communication circuit may be provided in the field resonator FRxp together with a rectifying and smoothing circuit.

Twelfth Embodiment

In a twelfth embodiment, an example will be illustrated in which a power transmitting device, a power receiving device, and a resonant device have different line conductor patterns.

Figure 28:
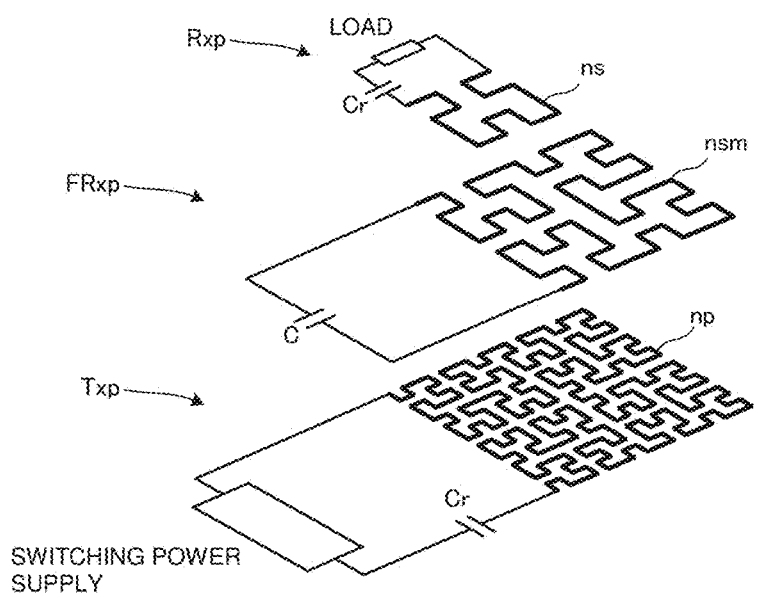
FIG. 28 is a diagram illustrating the arrangement of a power transmitter, a power receiver, and a field resonator, and example shapes of a power transmitting device, a power receiving device, and a resonant device.

FIG. 28 is a diagram illustrating the arrangement of a power transmitter, a power receiver, and a field resonator, and example shapes of a power transmitting device, a power receiving device, and a resonant device. In FIG. 28, the power transmitting device np of the power transmitter Txp uses a Hilbert curve where the number of steps is 4, the resonant device nsm of the field resonator FRxp uses a Hilbert curve where the number of steps is 3, and the power receiving device ns of the power receiver Rxp uses a Hilbert curve where the number of steps is 2. Here, the power transmitting device np and the resonant device nsm have about the same external size, but the size of the power receiving device ns is ¼ of the external size of the resonant device nsm. Hence, the pattern of the power receiving device ns is the same as a portion of the pattern of the resonant device nsm.

As illustrated by the relationship between the power transmitting device np and the resonant device nsm in this example, coupled line conductor patterns may be fractal-shaped devices with a relationship therebetween in which the numbers of steps (generations) n are different from each other. Since a fractal shape is characterized in that a portion is similar to the whole, a magnetic field generated by a line segment with the small number of steps corresponds to spatially averaged magnetic fields generated by a plurality of continuous line segments with the larger number of steps, fractal-shaped devices even with different numbers of steps (generations) n are coupled to each other.

Further, even when fractal devices have different sizes as in the relationship between the resonant device nsm and the power receiving device ns in this example, a high degree of coupling is obtained because the whole of one of the line conductor patterns coincides with a portion of the other of the line conductor patterns.

With the configuration described above, restrictions in the arrangement of the devices can be dealt with.

In the embodiments described above, examples have been illustrated in which a plurality of power receivers receive power from a common power transmitter. However, a plurality of power transmitters may be configured to supply power to a common power receiver.

Further, a configuration may be employed in which electric energy received by a plurality of power receivers is supplied as DC power to one or a plurality of loads.

In some the embodiments described above, a fractal device in which a line conductor extends along a surface is represented by a device shaped like a plane. However, the whole surface may be bowed or bent.

Reference Signs List

The invention claimed is:

1. A wireless power transmission apparatus comprising:
   a power transmitter including a DC power supply supplying electric energy and a power transmitting device electrically connected to the DC power supply,
   a power receiver including a load that consumes electric power and a power receiving device electrically connected to the load,
   a power transmitting resonant circuit formed of an inductive impedance included in the power transmitting device and a capacitive impedance of a resonant capacitor realized by a parasitic capacitance of the power transmitting device or an external capacitor,
   a power transmitting switching circuit, electrically connected to the power transmitting resonant circuit, including a switch device intermittently providing the power transmitting resonant circuit with the DC power supply through on and off operations and a switch control circuit causing the power transmitting resonant circuit to generate a resonant current through control of the switch device,
   a power receiving resonant circuit formed of an inductive impedance included in the power receiving device and a capacitive impedance of a resonant capacitor realized by a parasitic capacitance of the power receiving device or an external capacitor, and
   a power receiving switching circuit, electrically connected to the power receiving resonant circuit, including a switch device rectifying a resonance current flowing in a power receiving resonant circuit through on and off operations,
   a power receiving load circuit that is connected to the power receiving resonant circuit and that supplies energy based on a resonant current to the load,
   wherein the power transmitter and the power receiver are arranged with a space therebetween,
   wherein the power transmitting device generates a resonant current by taking out electric energy from the DC power supply through an operation of the power transmitting switch circuit, and creates, in a space, by using the resonant current, an electromagnetic field that periodically changes at a switching frequency fs, and forms an electromagnetic resonance field in which the space itself has energy and vibrates, wherein the power receiving device generates a resonant current by obtaining electric energy from the electromagnetic resonance field and forms a new electromagnetic field resonance field on a basis of the resonant current, wherein the power transmitting device or the power receiving device, when viewed as a geometric figure, is a fractal-shaped device formed of a continuous line conductor pattern through which resonance current flows in which a portion is similar to a whole, and constitutes a differential coil structure in all locations and increases electromagnetic field energy in a space surrounding the fractal-shaped device, and wherein the switching control circuit makes the switching frequency fs satisfy a relationship fs=fr±30% for a resonant frequency fr at which an imaginary part X of an equivalent input impedance when a whole load side is viewed from input of the power transmitting resonant circuit becomes zero, the input being connected to the power transmitting switching circuit.

2. The wireless power transmission apparatus according to claim 1, wherein the electromagnetic resonance field is formed in a region within one fifth of a product of a switching period Ts, which is an inverse of the switching frequency fs, and a speed of light from the power transmitting device or the power receiving device.

3. The wireless power transmission apparatus according to claim 1, further comprising:
a field resonator that includes at least one resonant device and that is arranged in a space of a near field in which the power transmitting device and the power receiving device exist; and
a resonant circuit formed of an inductive impedance and a capacitive impedance included in the resonant device or an external impedance,
wherein the resonant device generates a resonant current by obtaining electric energy from the resonance field and forms a new electromagnetic field resonance field from this resonant current, and
wherein the resonant device, when viewed as a geometric figure, is a fractal-shaped device formed of a continuous line conductor pattern through which resonance current generated by the resonant device flows in which a portion is similar to a whole, and electromagnetic field energy in a space surrounding the fractal-shaped device is increased.

4. The wireless power transmission apparatus according to claim 1, wherein the line conductor pattern of the power transmitting device or the power receiving device has a configuration in which a number of steps n is larger than or equal to two and an external shape is approximately a square, a triangle, or approximately a cube, or is a polygonal line.

5. The wireless power transmission apparatus according to claim 3, wherein the line conductor pattern of the resonant device has a configuration in which a number of steps n is larger than or equal to two and an external shape is approximately a square, a triangle, or approximately a cube, or is a polygonal line.

6. The wireless power transmission apparatus according to claim 4, wherein the line conductor pattern of the power transmitting device and the line conductor pattern of the power receiving device are fractal-shaped devices whose respective numbers of steps n are different from each other.

7. The wireless power transmission apparatus according to claim 5, wherein the line conductor pattern of the resonant device and the line conductor pattern of the power transmitting device or the power receiving device are fractal-shaped devices whose respective numbers of steps n are different from each other.

8. The wireless power transmission apparatus according to claim 1, wherein the power receiving load circuit includes a rectifier circuit and supplies DC electric energy to the load.

9. The wireless power transmission apparatus according to claim 1, wherein respective independent resonant frequencies of the power transmitting resonant circuit and the power receiving resonant circuit are the same within an error range of ±30%.

10. The wireless power transmission apparatus according to claim 3, wherein respective independent resonant frequencies of the power transmitting resonant circuit and the resonant circuit are the same within an error range of ±30%.

11. The wireless power transmission apparatus according to claim 1, wherein the switch device is an FET and the power transmitting switching circuit includes a parasitic capacitance of the FET and a free-wheeling diode.

12. The wireless power transmission apparatus according to claim 1, wherein the switching control circuit makes the switching frequency fs satisfy a relationship fs≥fr for the resonant frequency fr at which the imaginary part X of the equivalent input impedance when the whole load side is viewed from input of the power transmitting resonant circuit becomes zero, the input being connected to the power transmitting switching circuit, and the switching frequency fs is set such that the imaginary part X satisfies a relationship X≥0.

13. The wireless power transmission apparatus according to claim 1, wherein the switching control circuit is configured such that a zero-voltage switching operation is performed by controlling the switch device so as to turn on the switch device when a voltage between two ends of the switch device is decreased to about zero volts.

14. The wireless power transmission apparatus according to claim 3, wherein the field resonator is one of a plurality of field resonators arranged in a space in the near field.

15. The wireless power transmission apparatus according to claim 14, wherein respective independent resonant frequencies of the plurality of resonant circuits are the same within an error range of ±30%.

16. The wireless power transmission apparatus according to claim 1, wherein the power transmitter is provided in a plurality, and respective switching frequencies of the plurality of power transmitters are the same within an error range of ±30%.

17. The wireless power transmission apparatus according to claim 1, wherein the power receiver is provided in a plurality, and resonant frequencies of the respective power receiving resonant circuits included in the plurality of power receivers are the same within an error range of ±30%.

18. The wireless power transmission apparatus according to claim 1, wherein the power receiving device is provided in a plurality, and electric energy received by the plurality of power receiving devices is supplied to a load.

19. The wireless power transmission apparatus according to claim 1, wherein the power receiver is provided in a plurality, and respective switching frequencies of the plurality of power receivers are in an Industry-Science-Medical band.

20. The wireless power transmission apparatus according to claim 1, wherein the power transmitter includes a filter that removes a frequency component other than the switching frequencies.

21. The wireless power transmission apparatus according to claim 1, wherein the power transmitter and the power receiver each include a communication circuit for communication via a radio wave.

22. The wireless power transmission apparatus according to claim 3, wherein the field resonator includes a communication circuit for communicating with the power transmitter or the power receiver via a radio wave.

* * * * *